US010230532B2

(12) United States Patent
Chan et al.

(10) Patent No.: US 10,230,532 B2
(45) Date of Patent: Mar. 12, 2019

(54) ENTITY AUTHENTICATION IN NETWORK

(71) Applicant: Agency for Science, Technology and Research, Singapore (SG)

(72) Inventors: Aldar Chun Fai Chan, Singapore (SG); Jun Wen Wong, Singapore (SG); Jianying Zhou, Singapore (SG); Joseph Chee Ming Teo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 181 days.

(21) Appl. No.: 15/105,706

(22) PCT Filed: Dec. 12, 2014

(86) PCT No.: PCT/SG2014/000592
§ 371 (c)(1),
(2) Date: Jun. 17, 2016

(87) PCT Pub. No.: WO2015/094114
PCT Pub. Date: Jun. 25, 2015

(65) Prior Publication Data
US 2016/0315779 A1    Oct. 27, 2016

(30) Foreign Application Priority Data
Dec. 17, 2013    (SG) .................................. 01309317

(51) Int. Cl.
*H04L 9/32* (2006.01)
(52) U.S. Cl.
CPC ...... *H04L 9/3271* (2013.01); *H04L 2209/805* (2013.01)

(58) Field of Classification Search
CPC combination set(s) only.
See application file for complete search history.

(56) References Cited

U.S. PATENT DOCUMENTS

| 8,254,581 | B2 * | 8/2012 | Wan ..................... H04L 9/0825 380/278 |
| 2002/0009199 | A1 * | 1/2002 | Ala-Laurila .......... H04L 63/061 380/247 |

(Continued)

OTHER PUBLICATIONS

Menezes (Menezes et al., "Handbook of Applied Cryptography", ISBN: 0-8493-8523-7, Oct. 1996).*

*Primary Examiner* — Piotr Poltorak
(74) *Attorney, Agent, or Firm* — K. David Crockett, Esq.; Niky Economy Syrengelas, Esq.

(57) ABSTRACT

There is provided an entity authentication method for a network including a first entity and a second entity, the method including: selecting, at the first entity, one or more pieces of data processed by the first entity to be used for authenticating the second entity; tagging, at the first entity, each of the one or more pieces of data selected with a respective tag generated based on a first secret key of the first entity; sending, from the first entity, a set of authentication data comprising the one or more pieces of data and the respective tags to the second entity; and authenticating, by the first entity, the second entity using a challenge-response authentication technique based on the set of authentication data and the first secret key. There is also provided a corresponding system with entity authentication for a network, and an entity in a network with entity authentication.

14 Claims, 10 Drawing Sheets

(56) References Cited

U.S. PATENT DOCUMENTS

| | | | | |
|---|---|---|---|---|
| 2002/0012433 A1* | 1/2002 | Haverinen | ............... | H04L 63/08 |
| | | | | 380/247 |
| 2003/0166398 A1* | 9/2003 | Netanel | ................... | H04L 63/06 |
| | | | | 455/410 |
| 2008/0212771 A1* | 9/2008 | Hauser | ................... | G06F 21/305 |
| | | | | 380/44 |
| 2011/0268274 A1* | 11/2011 | Qiu | ....................... | H04L 9/0844 |
| | | | | 380/270 |
| 2012/0102319 A1* | 4/2012 | Falk | ..................... | G06F 21/305 |
| | | | | 713/156 |
| 2014/0310774 A1* | 10/2014 | Etchegoyen | ........ | H04L 63/0876 |
| | | | | 726/3 |

* cited by examiner

ENTITY AUTHENTICATION IN NETWORK

CROSS-REFERENCE TO RELATED APPLICATION

This application claims the benefit of priority of Singapore Patent Application No. 201309317-4, filed 17 Dec. 2013, the contents of which being hereby incorporated by reference in its entirety for all purposes.

TECHNICAL FIELD

The present invention generally relates to entity authentication in a network, such as a sensor network, and more particularly, to an entity authentication method for a network and a system with entity authentication for a network.

BACKGROUND

In various networks, entity authentication is typically required for one entity (referred to as the verifier) to verify the identity of another entity (referred to as the prover) before allowing access in order to prevent a security breach. For example, in the case of a sensor network, it is often necessary for a sensor node (verifier) configured to collect measurement data to verify a user requesting access to the sensor node through a server (prover) as a security measure. The user may be requesting access to retrieve various measurement data or to control/configure the sensor node. This is so that the sensor network is secure, without allowing any unauthorized user access to any sensor node in the sensor network.

Various entity authentication techniques exist in the art. For example, conventional two-factor authentication schemes would typically use the 'what you know' factor (such as passwords and secret keys) as the first factor, combined with an additional second factor which could be the 'what you have' (such as physical tokens, dedicated channels) or 'what you are' (such as biometrics) factors. However, all these schemes assumes the verifier as a computationally powerful machine, which render them non-applicable for networks with resource-constrained devices such as sensor nodes, SCADA Remote Terminal Units (RTUs), implant medical devices and other Internet of Things (IoT) devices. For example, U.S. Pat. No. 8,812,864 B2 uses biometrics (the 'what you are' factor) as the second factor, and the requirements in computation power, memory and storage on the verifier are overwhelmingly demanding for typical embedded devices. U.S. Pat. No. 8,214,888 B2 uses a USB token (the 'what you have' factor) as the second factor, which besides the problem of high resource demand on the verifier, is also not resilient to sensor node compromise or token compromise. U.S. Pat. No. 8,793,490 B1 uses two different channels to achieve authentication. However, this requirement may not be satisfied for sensor networks.

A need therefore exists to provide entity authentication in a network that seeks to overcome, or at least ameliorate, one or more of the deficiencies of conventional entity authentication techniques such as those mentioned above. It is against this background that the present invention has been developed.

SUMMARY

According to a first aspect of the present invention, there is provided an entity authentication method for a network including a first entity and a second entity, the method comprising:

selecting, at the first entity, one or more pieces of data processed by the first entity to be used for authenticating the second entity;

tagging, at the first entity, each of the one or more pieces of data selected with a respective tag generated based on a first secret key of the first entity;

sending, from the first entity, a set of authentication data comprising the one or more pieces of data and the respective tags to the second entity; and authenticating, by the first entity, the second entity using a challenge-response authentication technique based on the set of authentication data and the first secret key.

Preferably, said data processed at the first entity comprises pieces of data received or generated by the first entity, and said selecting comprises performing a predetermined function to determine whether to select a piece of data processed by the first entity.

Preferably, the predetermined function is a random function.

Preferably, the tag is generated further based on the piece of selected data associated with the tag.

Preferably, said authenticating comprises:

sending, from the first entity, a challenge to the second entity upon receiving an authorization request from the second entity;

sending, from the second entity, a response to the challenge to the first entity based on the set of authentication data and a second secret key; and verifying, at the first entity, whether the response received is valid by processing the response based on the first secret key for authenticating the second entity.

In an embodiment, each pair of the piece of data and the respective tag is indexed in the set of authentication data, and wherein:

said sending a challenge comprises sending the challenge including a selected set of indices from the set of authentication data, a first random number and a second random number, said sending a response comprises:
retrieving each piece of data and tag from the set of authentication data corresponding to an index in the selected set of indices; and
generating a response including a first parameter obtained based on the retrieved pieces of data and the first random number, a second parameter obtained based on the retrieved tags and the first random number, and a third parameter obtained based on the second random number and the second secret key, and said verifying whether the response received is valid comprises:
computing a first result based on the first and second parameters received and the first secret key, and computing a second result based on the third parameter received and the second secret key generated based on a third secret key that is shared between the first entity and the second entity; and
verifying whether the response received is valid based on the first and second results.

In another embodiment, each pair of the piece of data and the respective tag is indexed in the set of authentication data, and wherein:

said sending a challenge comprises sending the challenge including a selected set of indices from the set of authentication data, a random number encrypted using the second secret key generated based on a third secret key shared between the first entity and the second entity, said sending a response comprises:
  retrieving each piece of data and tag from the set of authentication data corresponding to an index in the selected set of indices; and
  generating a response including a first parameter obtained based on the retrieved pieces of data and the second secret key, and a second parameter obtained based on the retrieved tags and the second secret key, and
said verifying whether the response received is valid comprises:
  computing a result based on the first and second parameters received, and the first and second secret keys; and
  verifying whether the response received is valid based on the result.

Preferably, the second entity comprises a server and a proxy user having established a secured communication channel with the server, and the second key is generated based on a key derivation function using a third secret key shared between the first entity and the second entity, and one or more parameters associated with the proxy user, and wherein said sending a response to the challenge is delegated by the server to the proxy user to generate at least a part of the response.

Preferably, the first entity is a sensor and said data processed by the sensor comprises measurement data collected by the sensor and configuration or status data of the sensor.

According to a second aspect of the present invention, there is provided a system with entity authentication for a network, the system comprising:
  a first entity, and
  a second entity communicatively coupled to the first entity over the network, wherein
  the first entity comprises:
    a selection module configured to select one or more pieces of data processed by the first entity to be used for authenticating the second entity;
    a tagging module configured to:
      tag each of the one or more pieces of data selected with a respective tag generated based on a first secret key of the first entity; and
      send a set of authentication data comprising the one or more pieces of data and the respective tags to the second entity; and
    an authentication module configured to authenticate the second entity using a challenge-response authentication technique based on the set of authentication data and the first secret key.

Preferably, said data processed at the first entity comprises pieces of data received or generated by the first entity, and the selection module is configured to perform a predetermined function to determine whether to select a piece of data processed by the first entity.

Preferably, the predetermined function is a random function.

Preferably, the tag is generated further based on the piece of selected data associated the tag.

Preferably,
  the authentication module of the first entity is configured to send a challenge to the second entity upon receiving an authorization request from the second entity;
  the second entity comprises a proof generation module configured to send a response to the challenge to the first entity based on the set of authentication data and a second secret key; and
  the authentication module of the first entity is further configured to verify whether the response received is valid by processing the response based on the first secret key for authenticating the second entity.

In an embodiment, each pair of the piece of data and the respective tag is indexed in the set of authentication data, and wherein:
  the authentication module of the first entity is configured to send the challenge including a selected set of indices from the set of authentication data, a first random number and a second random number,
  the proof generation module of the second entity is configured to:
    retrieve each piece of data and tag from the set of authentication data corresponding to an index in the selected set of indices; and
    generate a response including a first parameter obtained based on the retrieved pieces of data and the first random number, a second parameter obtained based on the retrieved tags and the first random number, and a third parameter obtained based on the second random number and the second secret key, and
  the authentication module is further configured to:
    compute a first result based on the first and second parameters received and the first secret key, and computing a second result based on the third parameter received and the second secret key generated based on a third secret key that is shared between the first entity and the second entity; and
    verify whether the response received is valid based on the first and second results.

In another embodiment, each pair of the piece of data and the respective tag is indexed in the set of authentication data, and wherein:
  the authentication module of the first entity is configured to send a challenge comprises sending the challenge including a selected set of indices from the set of authentication data, a random number encrypted using the second secret key generated based on a third secret key shared between the first entity and the second entity,
  the proof generation module of the second entity is configured to:
    retrieve each piece of data and tag from the set of authentication data corresponding to an index in the selected set of indices; and
    generate a response including a first parameter obtained based on the retrieved pieces of data and the second secret key, and a second parameter obtained based on the retrieved tags and the second secret key, and
  the authentication module is further configured to:
    compute a result based on the first and second parameters received, and the first and second secret keys; and
    verify whether the response received is valid based on the result.

Preferably, the second entity comprises a server and a proxy user having established a secured communication channel with the server, and the second key is generated based on a key derivation function using a third secret key shared between the first entity and the second entity, and one or more parameters associated with the proxy user, and wherein the server comprises a delegation module configured to delegate at least a part of the functions of the proof generation module to the proxy user to generate at least a part of the response.

Preferably, the first entity is a sensor and said data processed by the sensor comprises measurement data collected by the sensor and configuration or status data of the sensor.

According to a third aspect of the present invention, there is provided an entity in a network with entity authentication, the entity comprising:

a selection module configured to select one or more pieces of data processed by the entity to be used for authenticating another entity;

a tagging module configured to:

tag each of the one or more pieces of data selected with a respective tag generated based on a first secret key of the entity; and send a set of authentication data comprising the one or more pieces of data and the respective tags to said another entity; and an authentication module configured to authenticate said another entity using a challenge-response authentication technique based on the set of authentication data and the first secret key.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Figure 1:
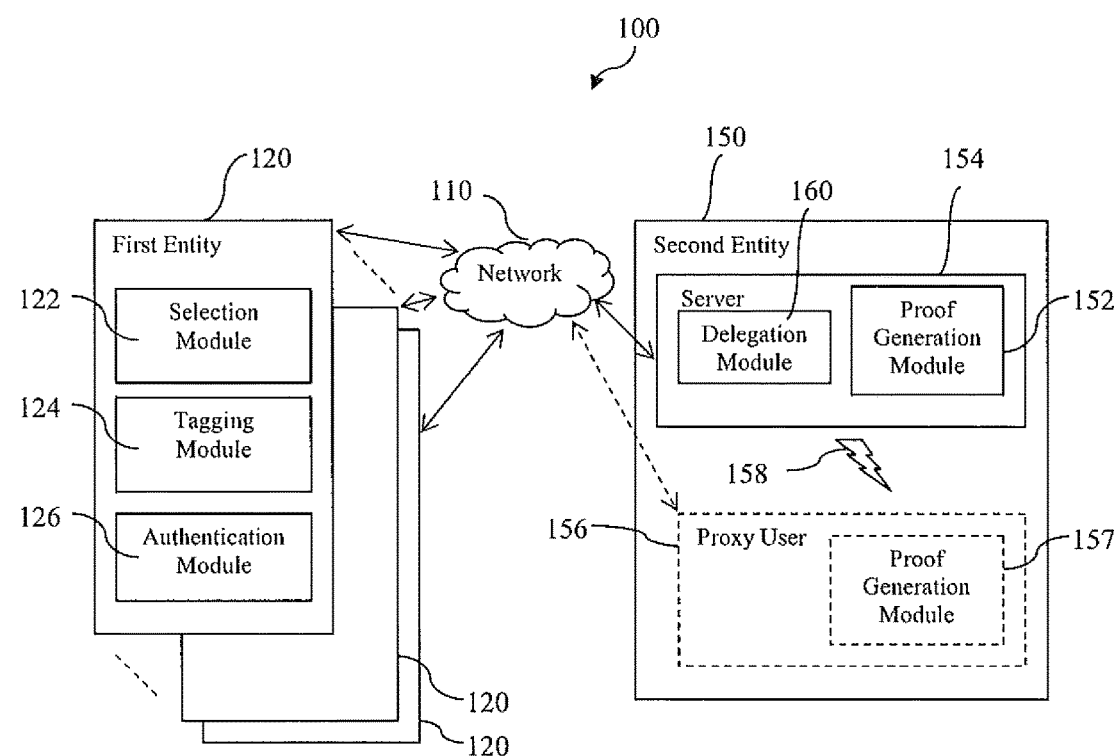
FIG. 1 depicts a schematic diagram of a system with entity authentication for a network according to an embodiment of the present invention.

Embodiments of the present invention provide entity authentication in a network that seeks to overcome, or at least ameliorate, one or more of the deficiencies of conventional entity authentication techniques such as those mentioned in the background. For example, according to an embodiment of the present invention, there is provided an entity authentication method for a network that uses two authentication factors, the first authentication factor being based on a pre-shared secret key (what the verifier entity and the prover entity already know) and the second authentication factor being based on data processed by the verifier (what have been processed at the verifier entity). Therefore, the entity authentication described in this embodiment may be referred to as a two-factor entity authentication.

In particular, according to the embodiment, certain pieces of such data processed at the verifier entity are selected to be used as authentication data for authenticating the prover entity. As known in the art for entity authentication, the entity that is attempting to prove that it is what it claims to be is referred to as the prover, and the entity that is determining whether or not the prover is what it claims to be is called the verifier. In the embodiment, the data processed by the verifier entity is generally any data received or generated by the verifier entity, including any configuration or status data at the verifier entity. These data can also be referred to as historical data or big data (a term commonly used in the art). Big data (typically characterized in terms such as volume, velocity, variety, and sometimes veracity) are usually unstructured in the sense that no uniform format can be assumed for the data of interests, thus giving rise to the great variety of data to be handled.

The two-factor entity authentication technique according to the embodiment is advantageously lightweight for the verifier, and is thus suitable even for a verifier which is a resource-constrained device (e.g., limited storage and memory capacity, and is computationally constrained). The requirements on computation, memory and storage can therefore be readily satisfied by typical embedded devices. Therefore, for example, a sensor node in a sensor network as the verifier can have sufficient power to authenticate a computer device (e.g., a laptop) attempting to access it. In addition, as will be described later below, the two-factor entity authentication technique according to a further embodiment advantageously allows the delegation of the prover's task to another user, which cannot be attained by conventional authentication techniques based on the 'what you are' factor, or 'what you have' factor. As mentioned above, the two-factor entity authentication technique uses, for example, historic data or traffic exchanged between the prover and verifier as the second authentication factor to authenticate the prover to the verifier. Nevertheless, as will be appreciated from the various embodiments described herein, the verifier does not need to store all these historic data and only needs to possess secret keys to authenticate the prover.

For example, in the case of a sensor network, the verifier entity can be a sensor node and the prover entity can be a server such as a backend server repository. Therefore, the data processed at the sensor include measurement data collected by sensor and configuration or status data of the sensor. In particular, for the second authentication factor, a challenge-response authentication technique is implemented based on such data processed by the verifier entity.

Embodiments of the present invention also provide a system with entity authentication for a network, and an entity (verifier entity) in a network with entity authentication. It will be appreciated that the embodiments described herein can be modified in various aspects without deviating from the essence of the present invention.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

FIG. 1 depicts a schematic diagram of a system 100 with entity authentication for a network 110 according to an embodiment of the present invention. As shown, the system 100 comprises a first entity 120 and a second entity 150 communicatively coupled to the first entity 120 over the network 110. In the embodiment, relating to entity authentication, the first entity 120 is a verifier and the second entity 150 is a prover. It will be appreciated to a person skilled in the art that there can be any number of first entity (verifier) 120 and second entity (prover) 150 in the network 110 as desired. In the embodiment, the first entity 120 comprises a selection module 122 configured to select one or more pieces of data processed by the first entity 120 to be used for authenticating the second entity 150, and a tagging module 124 configured to tag or associate each of the one or more pieces of data selected with a respective tag generated based on a first secret key (e.g., secret keys K,K' randomly chosen) of the first entity 120, and send a set of authentication data comprising the one or more pieces of data and the respective tags to the second entity 150. The authentication module 126 is configured to authenticate the second entity 150 using a challenge-response authentication technique based on the set of authentication data and the first secret key.

In the embodiment, the data processed at the first entity 120 comprises pieces of data received or generated by the first entity 120, and the selection module 122 is configured to perform a predetermined function (e.g., a random function) to determine whether to select a piece of data processed by the first entity 120 to be included in the set of authentication data. For example, in the case of a sensor network 110, data collected or generated by the sensor (first entity) 120 (in essence, any data collected, generated or stored by the sensor 120 or used to configure the sensor 120) may be randomly selected for inclusion in the set of authentication data to be used for authenticating the server 154 (part of the second entity 150) later on. Furthermore, for each piece of selected data ($D_i$), a marker tag ($T_i$) is generated by the sensor 120 for tagging or labeling the respective selected data ($D_i$). In an embodiment, the tag ($T_i$) is generated based on the first secret key (e.g., secret keys K,K') and the piece of selected data ($D_i$) associated with the tag ($T_i$). The set of authentication data may be arranged or structured in tuples which is then sent to the backend server repository 154 to be used as authentication data when performing the prover task (i.e., generating a proof in response to a challenge by the sensor 120 in order authenticate itself).

In an embodiment, since the tuples are indexed, it is not necessary for the sensor 120 to remember which data have been chosen. The sensor 120 simply needs to know the maximum index (L) of the selected and marked data, i.e., the last or final index of the set of authentication data. With this maximum index (L), all the pieces of data ($D_i$'s) in the set of authentication data can be referred to by an index (i) up to the maximum index (L), e.g., $I \subset \{i:0<i\leq L\}$. At the repository 154, all the pieces of data ($D_i$'s) can be shared with the public as usual data, but it is a security requirement that the tags ($T_i$'s) be kept secret.

In the embodiment of FIG. 1, the authentication module 126 of the first entity 120 is configured to send a challenge to the second entity 150 upon receiving an authorization request from the second entity 150. As shown in FIG. 1, the second entity 150 comprises a proof generation module 152 configured to send a response to the challenge to the first entity 120 based on the set of authentication data and a second secret key (e.g., user key $k_{user}$). In the embodiment, the second secret key is generated based on a third secret key (e.g., master key mk) shared between the first entity 120 and the second entity 150. The authentication module 126 of the first entity 120 is further configured to verify whether the response received is valid by processing the response based on the first secret key for authenticating the second entity 150.

Figure 2:
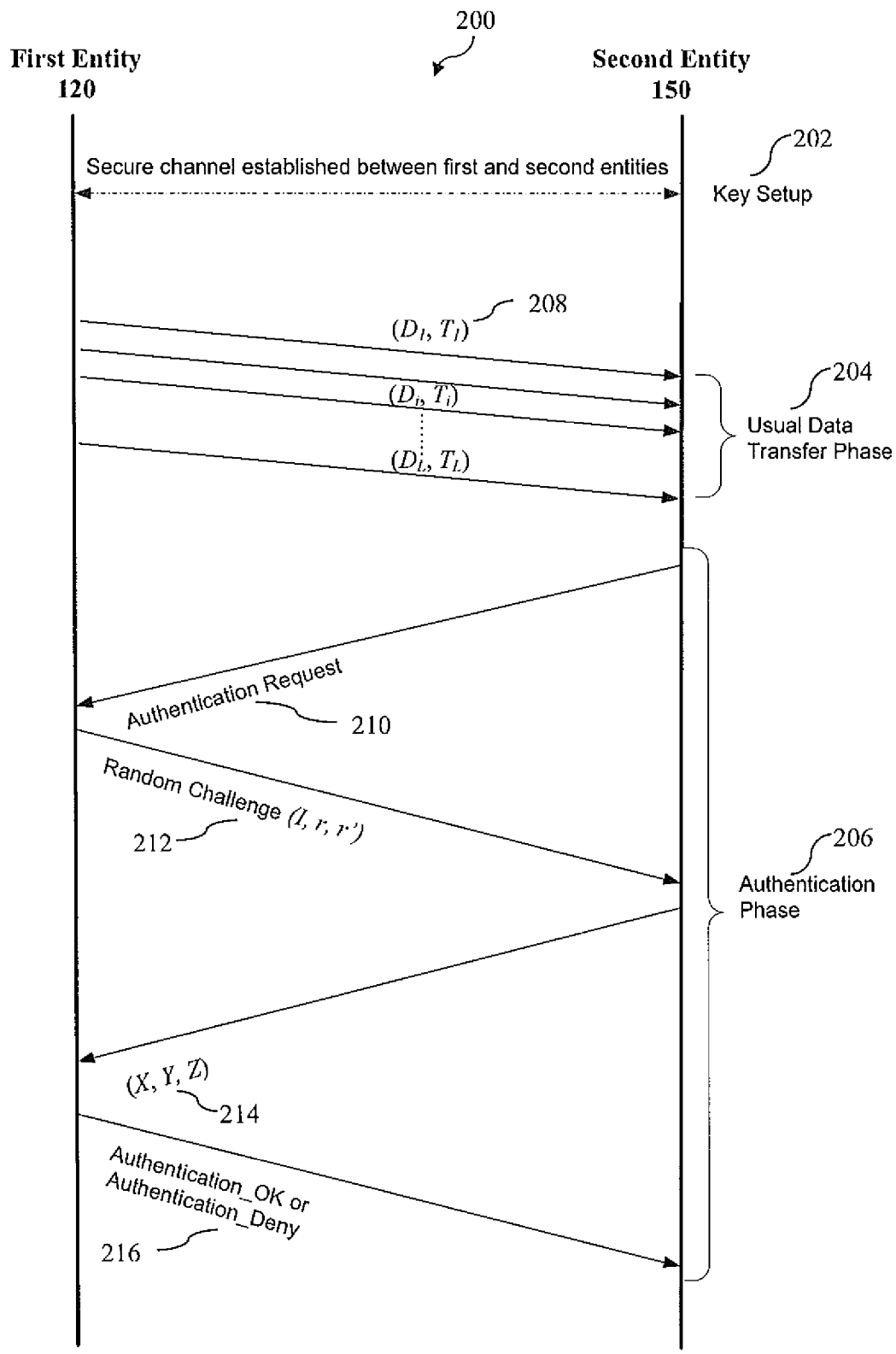
FIG. 2 depicts a general operational overview of the entity authentication method according to an example embodiment of the present invention.

For a better understanding, a general operational overview of the entity authentication will now be described according to an example embodiment with reference to FIG. 2. At setup 202, the first entity 120 and the second entity 150 (e.g., sensor S (verifier) and repository R (prover), respectively) share a master key (mk) which is used in the first authentication factor. The first entity 120 also randomly picks secret keys K, K' (first secret key) to be kept secret from the second entity 150. In addition, as data are received or generated by the first entity 120 and passed to the second entity 150 as usual operation data 204 (e.g., measurement data collected by the first entity 120 or configuration/status data), some of these data are selected (e.g., randomly) and tagged for use in the second authentication factor. The tag ($T_i$) is generated by the first entity 120 using K, K' for each piece of selected data ($D_i$). The tuples ($D_i$, $T_i$) 208 are then deposited at the second entity 150 (preferably, the backend server repository 154) to be used for the second authentication factor. As mentioned previously, while the pieces of selected data ($D_i$) may be shared with the public as usual data, it is a security requirement that the tags ($T_i$) be kept secret. During the authentication/verification phase 206, the first entity 120 (which is the verifier) presents some random challenges 212 to the second entity 150 (which is the prover) upon receiving an authentication request 210 from the second entity 150. The second entity 150 then uses the master key (mk), the selected $D_i$'s and their tags $T_i$'s (with the set of indices (I) being selected by the first entity 120 when generating the challenge 212), and the challenge (determined by the first entity 120) to generate a proof or response 214 for verification/authentication by the first entity 120.

In an embodiment, the second entity 150 comprises a server 154 and a proxy user 156 having established a secure communication channel 158 with the server 154. In this regard, the second secret key (e.g., user key $k_{user}$), which establishes the secure communication channel 158 between the first entity 120 and the second entity 150, is generated based on a key derivation function using a third secret key (e.g., master key mk) and one or more parameters associated with the proxy user 156. In this embodiment, a delegation mechanism is introduced for allowing the second entity 150 (e.g., the server 154) to delegate the prover task to a user 156. In particular, the server 154 comprises a delegation module 160 configured to delegate at least a part of the functions of the proof generation module 152 to the proxy user 156 to generate at least a part of the response. Thus in this case, the proxy user 156 comprises a proof generation module 157. In an embodiment, the parameters associated with the proxy user 156 used by the key derivation function to generate the second secret key are an identity parameter of the user and a temporal parameter (e.g., date or time). In the embodiment, the function of the temporal parameter is to enforce expiration of a delegation. For example, if hour is used, the granularity of the authorization period would be in hours. The use of such parameters is described in an example later below.

It will be appreciated to a person skilled in the art that various modules described herein may be specially constructed for the required purposes, or may be implemented in a general purpose computer or other devices. For example, the various modules may be software modules realized by one or more computer programs or one or more sets of instructions executable by a computer processor to perform the required functions, or may be hardware modules being functional hardware units designed to perform the required functions. It will also be appreciated that a combination of hardware and software modules may be implemented.

Figure 3:
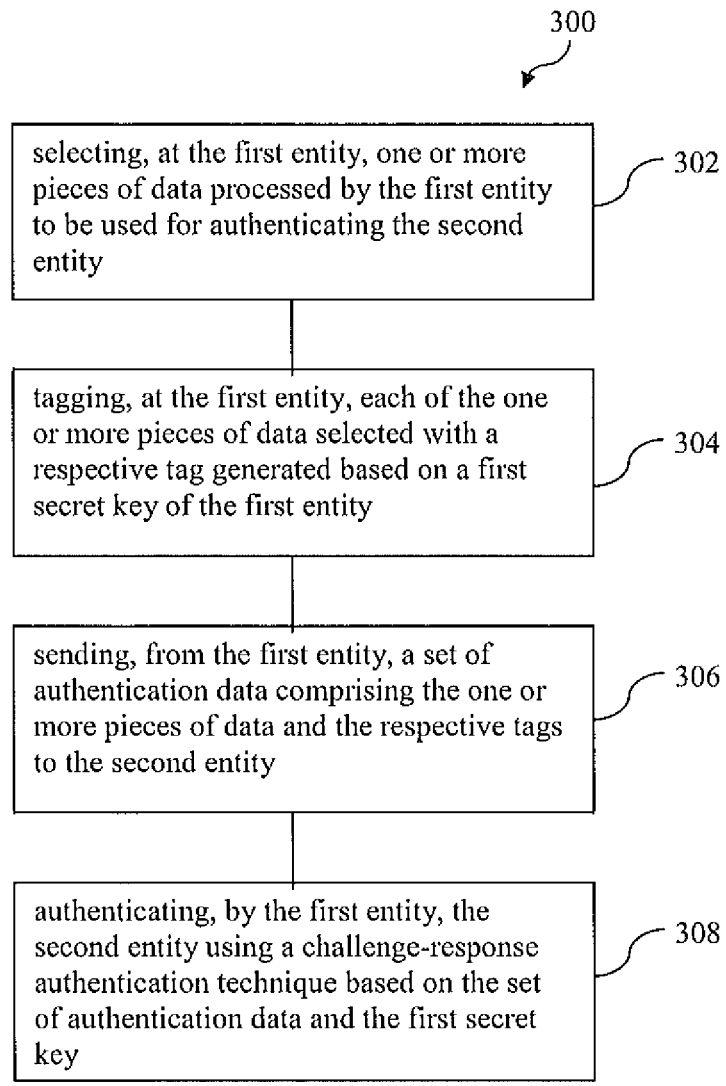
FIG. 3 depicts an overview of an entity authentication method for a network including a first entity and a second entity corresponding to the system with entity authentication described with respect to FIG. 1.

FIG. 3 depicts an overview of an entity authentication method 300 for a network 110 including a first entity 120 and a second entity 150 corresponding to the system 100 with entity authentication described above with respect to FIG. 1. The method 300 comprises a step 302 of selecting, at the first entity 120, one or more pieces of data processed by the first entity 120 to be used for authenticating the second entity 150, a step 204 of tagging or associating, at the first entity 120, each of the one or more pieces of data selected with a respective tag generated based on a first secret key of the first entity 120, a step 306 of sending, from the first entity 120, a set of authentication data comprising the one or more pieces of data and the respective tags to the second entity, and a step 308 of authenticating, by the first entity 120, the second entity 150 using a challenge-response authentication technique based on the set of authentication data and the first secret key. As described hereinbefore, the data processed at the first entity 120 may comprise pieces of data received or generated by the first entity 120, and the step 302 of selecting preferably comprises performing a predetermined function (preferably a random function) to determine whether to select a piece of data processed by the first entity 120 for use as authentication data.

It will be appreciated to a person skilled in the art that the methods or techniques of various embodiments described herein may be implemented as one or more executable computer program or one or more sets of instructions executable by a computer processor to carry out the steps described therein. As another example, the methods or techniques may be implemented as one or more hardware modules being a functional hardware unit designed to perform the steps described therein. It will also be appreciated that a combination of hardware and software modules may be implemented.

For a better understanding of the present invention, the entity authentication method 300 and system 100 described above with reference to FIGS. 1 to 3 will now be described in further details, including specific examples or implementations (e.g., specific components, configurations and steps) according to various embodiments of the present invention. Although the specific examples or implementations described hereinafter may be preferred in certain embodiments of the present invention, it will be appreciated by a person skilled in the art that the present invention is not limited as such, and other components, configurations and steps may be used as appropriate without deviating from the scope of the present invention.

Hereinafter, for simplicity and clarity, examples will be described below according to example embodiments of the present invention for the case where the network 110 is a sensor network, the first entity 120 is a sensor (S) for collecting and processing measurement data, and the second entity 150 is a repository (R) at a backend server 154. It will be appreciated by a person skilled in the art that the network 110 is not limited to a sensor network and can be other types of network requiring entity authentication, such as implant medical devices, SCADA Remote Terminal Units (RTUs) and other Internet of Things (IoT) devices.

An exemplary implementation of the entity authentication method 300 according to an example embodiment of the present invention will now be described. In the implementation, two instances of the challenge-response protocol or technique (i.e., one for each of the two authentication factors) are executed concurrently, with data concatenated (back-to-back) in all the communications. There is also flexibility in choosing the finite field arithmetic used for the protocol, for example, either $Z_p$ (integer modular p where p is some prime number) or $F_{2^l}$ (the binary extension field of length 1 bits) can be used in the protocol. Preferably, the binary extension field is adopted and is used in embodiments of the present invention unless stated otherwise. Also in this example embodiment, the repository R at the backend server 154 is taken as the prover in the protocol execution, that is, the prover task is not delegated to a proxy user 156 unless stated otherwise.

In this example embodiment, the following components are used:

1) A collision-resistant, length-matching hash function h(•) is used to compress the data $D_i$'s (treated as an arbitrary string) to match the size of the finite field used for the arithmetic of the protocol. In embodiments of the present invention, by default, the binary extension field is used as the basis for arithmetic unless stated otherwise. Nevertheless, $F_p$ should not be excluded from adoption in the protocol, as long as the corresponding pseudorandom function (PRF) and hash function (h) are used as well.

2) A pseudorandom function (PRF), denoted by $f$, is the main core of the two-factor authentication protocol in the example embodiment. For example, possible candidates for $f$ can be SHA1-HMAC (or SHA2-HMAC) or AES-OMAC. All these are standardized implementation. However, it will be appreciated to a person skilled in the art that there are many other possibilities, including proprietary designs, to instantiate $f$ with other conjectured PRF's. It will be appreciated that the authentication protocol of the example embodiment does not place very specific restriction on the choice of PRF's.

According to an embodiment of the present invention, in order to facilitate higher efficiency and compactness of the protocol, it is preferable to choose a finite field which matches the selected PRF in the implementation, though such a requirement is not mandatory. As preferred examples, $F_{2^{160}}$ (for SHA1-HMAC), $F_{2^{256}}$ or $F_{2^{384}}$ (for SHA2-HMAC) or $F_{2^{128}}$ (for AES-OMAC) may be used. When HMAC is used, the same hash function used to compose HMAC could also be used as a candidate for h as well. In addition, the PRF instantiated by HMAC could be of the form: $f: \{0,1\}^\lambda \times \{0,1\}^* \to \{0,1\}^\lambda$. As another example, $Z_p$ could instead be used. If so, a proper PRF, $f: \{0,1\}^\lambda \times \{0,1\}^* \to Z_p$, and hash function h(•) has to be found.

3) A block cipher (E,D) where E,D: $\{0,1\}^{\lambda'} \times \{0,1\}^l \to \{0,1\}^l$ with key length $\lambda'$ and block size l. In the following, $Enc_K(•)$ denotes a certain encryption function (e.g., AES-CBC) using key K, and $Dec_K(•)$ is the corresponding decryption function. To encrypt the challenge sent from sensor (S) 120 to repository (R) 154, a proper chaining mode (e.g., Cipher Block Chaining (CBC)), may be necessary if $\lambda > l$. Otherwise, the block cipher could encrypt the challenge directly with padding.

4) A key derivation function kdf(•) which is keyed by the master key mk and takes in an input of the form UserID||date to output a user key $k_{user}$. That is, $k_{user} = kdf_{mk}(UserID||date)$. For example, the key derivation function can be instantiated either based on the PRF $f$ or the block cipher E. In particular, they key derivation function can be instantiated as follows:

Based on E: $k_{user} = E_{mk}(E_{mk}(UserID||date||padding))$
Based on $f$: $k_{user} = G(f_{G(mk)}(UserID||date))$ In the example embodiment, when the block cipher is used to compose the key derivation function, since the input UserID||date is typically smaller than the block size of most conventional schemes, some prescribed padding bits need to be appended to the input before applying the block cipher on the input. For example, the padding could be all 0's or all 1's, but must be agreed upon beforehand.

On the other hand, when $f$ is used to derive the user key ($k_{user}$), two length-matching functions G(•) and G'(•) are needed. G(•) is a truncation function to match the PRF output to the key size of the block cipher if $\lambda > \lambda'$. If $\Delta < \lambda'$, G(•) is implemented by invoking $f$ multiple times, fed with subsequent inputs formed by appending a sequence number 0, 1, . . . to the input data User||date, and concatenating the subsequent outputs to form a longer key. The longer key is then truncated to match the desired length of the block cipher. G'(•) is a length-matching function between the block cipher output and the PRF seed. It is possible that the block size of the chosen block cipher (denoted by l) may not match the seed size $\lambda$ of the PRF. When the block cipher output is fed to the PRF as the latter's seed, the length-matching function G'(•) is used. G'(•) is implemented by using AES or other block cipher schemes in the counter mode with block input of 0, 1, . . . for a larger $\lambda$ and then performing truncation on the concatenated outputs. The number of blocks needed depend on the relative length between a block and the seed of the PRF. For a smaller $\lambda$, G'(•) could be implemented simply as a truncation function.

When binary extension fields are used, as in the cases wherein HMAC and OMAC are used, low-weight irreducible polynomials can be looked up from standard mathematical resources to implement the needed finite field arithmetic. For example, the following irreducible polynomials can be used:

$x^{128} + x^7 + x^2 + x + 1 \in F_2[x]$ (for 128 bits as in AES-OMAC);
$x^{160} + x^5 + x^3 + x^2 + 1 \in F_2[x]$ (for 160 bits as in SHA1-HMAC);
$x^{256} + x^{10} + x^5 + x^2 + 1 \in F_2[x]$ (for 256 bits as in SHA2-HMAC).

As an example only, the two-factor entity authentication method can be instantiated with the following components: SHA2 (256 bits) (which is one of the NIST standards) for h(•) and $f$ (using HMAC instantiated by SHA2), the binary extension field $F_{2^{256}}$ using the irreducible polynomial $x^{256} + x^{10} + x^5 + x^2 + 1 \in F_2[x]$ for all the arithmetic, and AES (also standardized by NIST) for the block cipher and the key derivation function kdf(•).

Figure 4:
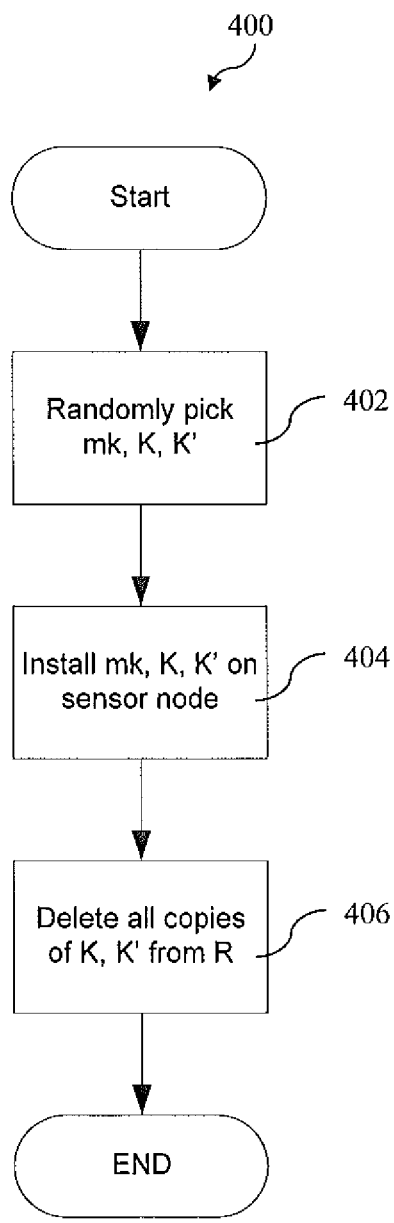
FIG. 4 depicts a flow diagram illustrating an exemplary key installation method by the repository according to an example embodiment of the present invention.
Figure 5:
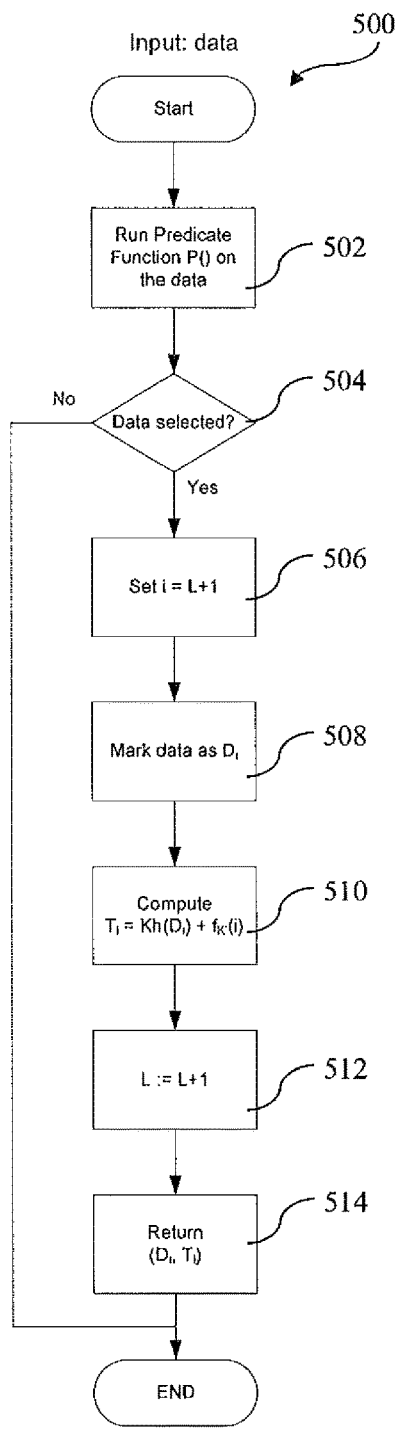
FIG. 5 depicts a flow diagram illustrating an exemplary tag generation method by the sensor according to an example embodiment of the present invention.
Figure 6:
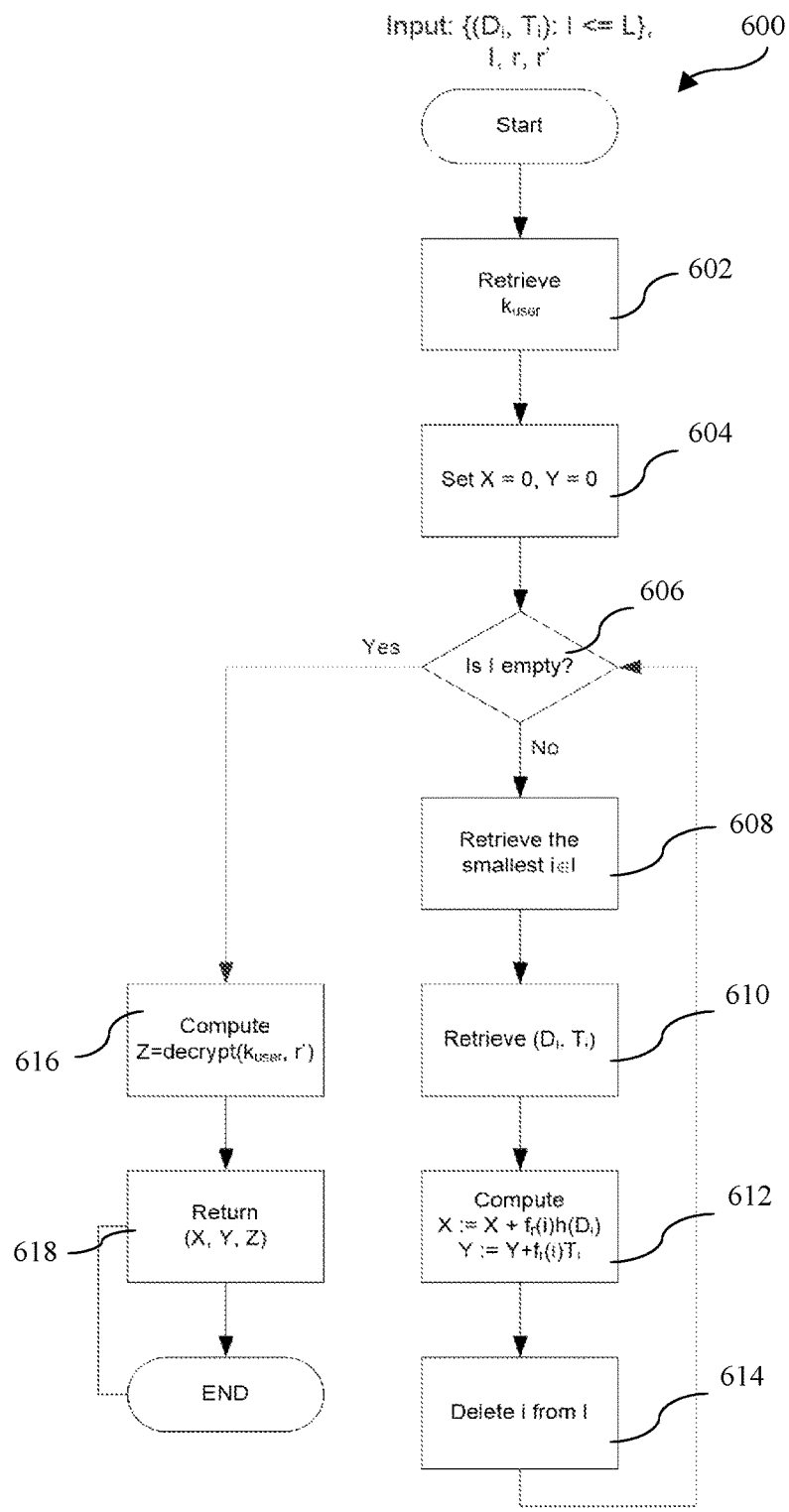
FIG. 6 depicts a flow diagram illustrating an exemplary proof/response generation method by the repository according to an example embodiment of the present invention.
Figure 7:
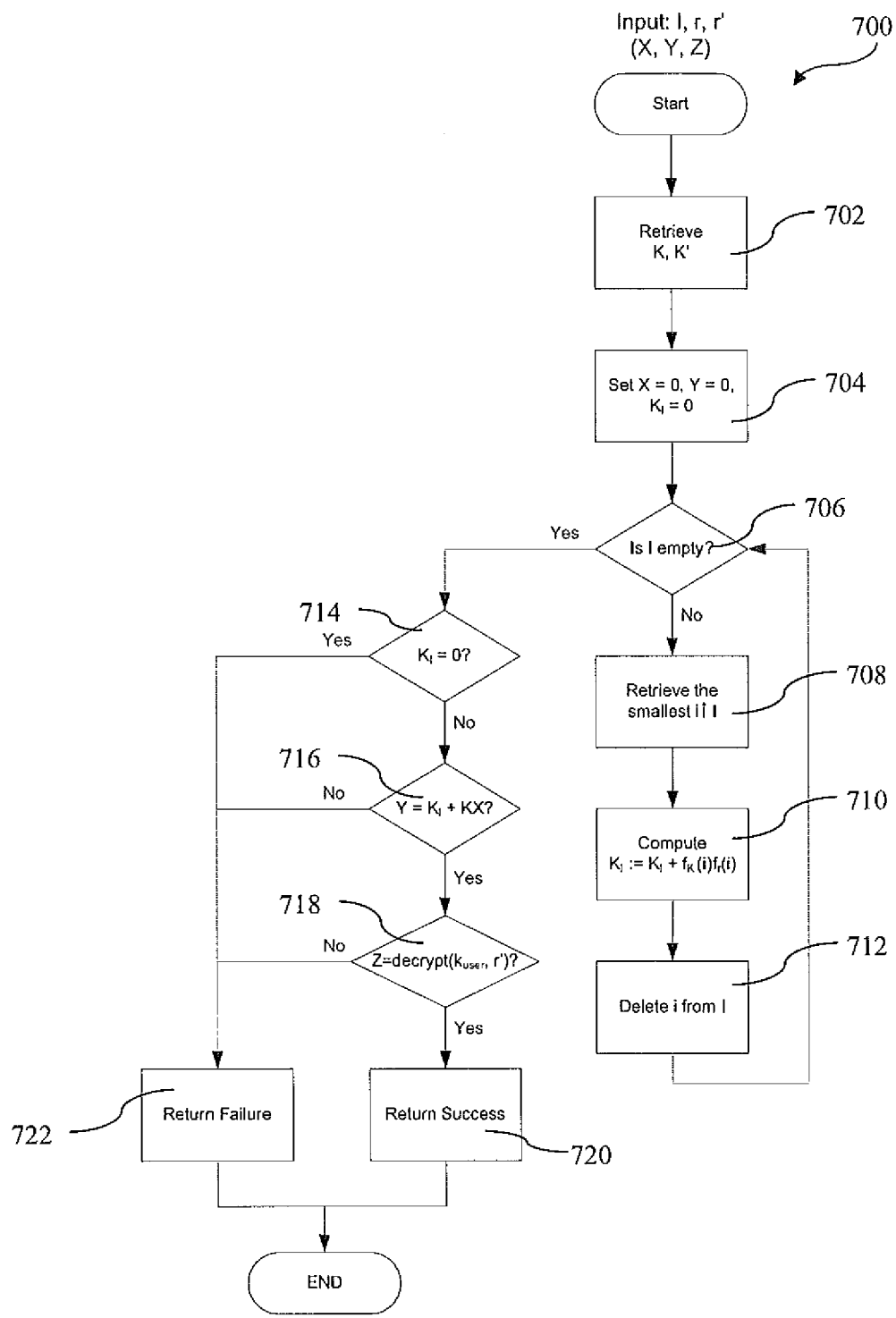
FIG. 7 depicts a flow diagram illustrating an exemplary proof verification method by the sensor according to an example embodiment of the present invention.

Having described the various components above, the various stages or phases of the exemplary implementation of the entity authentication method 300 according to the example embodiment will now be described. In particular, they include the setup phase, the tagging phase, and the authentication phase. As examples, FIG. 4 depicts a flow diagram illustrating an exemplary key installation method 400 by the repository (R) 154, FIG. 5 depicts a flow diagram illustrating an exemplary tag generation method 500 by the sensor (S) 120, FIG. 6 depicts a flow diagram illustrating an exemplary proof/response generation method 600 by the repository (R) 154, and FIG. 7 depicts a flow diagram illustrating an exemplary proof verification method 700 by the sensor (S) 120.

Setup Phase

Initialization

For a security parameter $\lambda$, choose a finite field F of size $o(2^\lambda)$. That is, elements in F should be at least $\lambda$ bits long.
1. Choose a pseudorandom function $f: \{0,1\}^\lambda \times \{0,1\}^* \to F$ (with key length $\lambda$);
2. Choose a length-matching hash function h: $\{0,1\}^* \to F$;
3. Choose a block cipher (E,D) where E,D: $\{0,1\}^{\lambda'} \times \{0,1\}^l \to \{0,1\}^l$ with key length $\lambda'$ and block size l;
4. Choose a key derivation function kdf: $\{0,1\}^{\lambda'} \times \{0,1\}^* \to \{0,1\}^{\lambda'}$.

Key Generation ($KG_R$) by Repository (R) 154:

Randomly choose a secret key $mk \in \{0,1\}^\lambda$ (third secret key) (see step 402 of FIG. 4) say, for AES, and share it with sensor (S) 120 (see step 404 of FIG. 4). The master key mk is shared between sensor (S) 120 and repository (R) 154 and is used to derive the user key $k_{user}$ (second secret key) as follows:

$$k_{user} = kdf_{mk}(\text{UserID}\|\text{date}).$$

It will be appreciated that $kdf_{mk}(\bullet)$ can be implemented by the block cipher or the PRF, but the block cipher method is preferred in this example embodiment. After running this phase, a secure communication channel has been established between repository (R) 154 and sensor (S) 120 through the master key mk. Similarly, $k_{user}$ can establish a secure communication channel 158 between the repository (R) 154 and the user (U) 156.

Key Generation ($KG_S$) by Sensor (S) 120:

Randomly choose two keys $K, K' \in F$ (except 0) (first secret key). Both K and K' should be kept secret from repository (R) 154. It could be that repository (R) 154 picks and installs these two keys to sensor (S) 120 (see step 402 of FIG. 4) and either forgets them afterwards without storing them in itself after bootstrapping or deletes them from itself (see step 406 of FIG. 4). If F is the binary extension field, a random bit string is chosen. For example, if $F_{2^{160}}$ is used, K and K' are 160-bit random bit strings.

Tagging Phase

Tag Generation (TG) by Sensor (S) 120:

For each piece of selected data $D_i$, with index i (Note that i=L+1), do the following:

1. Retrieve the keys K,K';
2. Generate a new segment key $k_i$ by computing $k_i = f_K(i)$;
3. Compute the tag $T_i = K \cdot h(D_i) + k_i$ (see step 510 of FIG. 5);
4. Increase L by 1 (see step 512 of FIG. 5);
5. The tuple $(D_i, t_i)$ is sent to the repository (R) 154 (see step 514 of FIG. 5).

Authentication Phase

Challenge Generation (CG) by Sensor (S) 120:

To generate the challenge for an authentication session, do the following:

1. Choose a random set of indices, $I \subset \{i: 0 < i \leq L\}$;
2. Choose a random number $r' \in \{0,1\}^\lambda$ (first random number);
3. Choose another random number $r \in \{0,1\}^l$ (second random number);
4. The 3-tuple challenge (I, r, r') is sent out to the prover (which can be the user (U) 156 or the backend server repository (R) 154).

Proof Generation (PG) by Repository (R) 154:

To generate a proof for all the data pieces with indices in I, do the following:

1. For r', do:
   (a) for each $i \in I$, retrieve $(D_i, T_i)$ (see steps 608 and 610 in FIG. 6);
   (b) compute $X = \Sigma_{i \in I} f_{r'}(i) \cdot h(D_i)$ (see step 612 in FIG. 6);
   (c) compute $Y = \Sigma_{i \in I} f_{r'}(i) \cdot T_i$ (see step 612 in FIG. 6);
   Note: The arithmetic to be performed ($Z_p$ or $F_{2^\lambda}$) is determined by the choice of the PRF being used.
2. For r, do:
   (a) compute (for R) or retrieve (for U) the key $k_{user}$;
   (b) compute $Z = Dec_{k_{user}}(r)$ (see step 616 in FIG. 6);
3. Output (X,Y,Z) as the proof p(I) (see step 618 in FIG. 6).

Proof Verification (PV) by Sensor (S) 120:

Given a proof (X',Y',Z') and a challenge tuple (I,r,r') the verification is performed as follows.

1. Retrieve the secret/session keys K,K' (see step 702 in FIG. 7);
2. Compute $K_I = \Sigma_{i \in I} f_{K'}(i) \cdot f_{r'}(i)$ (see step 710 in FIG. 7);
3. Check $Y' \stackrel{?}{=} K_I + K \cdot X$. If yes, continue to the next step, otherwise, stop and return 0 (see step 716 in FIG. 7);
4. Generate $k_{user}$ from mk;
5. Check $Z' \stackrel{?}{=} Dec_{k_{user}}(r)$. If yes, return 1, otherwise, return 0 (see step 718 in FIG. 7)

Note that in the above exemplary implementation, I={i: indices selected by sensor (S) 120 as the challenge for the proof by repository (R) 154). For example, the set I can be generated by a random number generator with a seed s chosen by sensor (S) 120 or can just be a random set of equally spaced indices. As an example for the latter case, I={i+r:i mod a=0; $0 \leq i < L$; $r \in [0,a-1]$}) where a is the space between two consecutive indices in I and r is a randomly chosen number. Suppose, t indices are needed in the challenge, then a could be determined as [L/t]. Besides, $r' \in \{0,1\}^\lambda$ is the random challenge chosen by sensor (S) 120 for each session of authentication. Preferably, r' should only be used once.

Also note that in the above exemplary implementation, '0' indicates a failure in authenticating the prover, while '1' indicates a success of authenticating the prover's identity.

It will be appreciated to a person skilled in the art that the present invention is not limited to the exemplary implementation of the entity authentication method 300 described above and that various modifications can be made as appropriate. To illustrate this, another exemplary implementation of the entity authentication method 300 according to another example embodiment of the present invention will now be described. This implementation seeks to optimize efficiency by combining the two instances of the challenge-response protocol as one execution with a view to reducing the communication overhead. In this regard, when the two instances are executed separately, two random challenges are generated by the verifier and the prover computes two responses in parallel based on these two challenges. When the two instances are combined, only one challenge is generated by the verifier. The challenge is then used to compute the response for the first authentication factor. Sequentially, this response is then used as the challenge (instead of an independently generated challenge) for the second authentication factor. Only the response for the second authentication factor is used as the proof sent to the verifier. The key generation and tag generation steps are the same as those described in the above exemplary implementation and thus will not be repeated for conciseness. The main difference lies in the execution of the challenge-response protocol. The backend server repository (R) 154 is also taken as the prover in this exemplary implementation.

Authentication Phase

Challenge Generation (CG) by Sensor (S) 120:

To generate the challenge for an authentication session, do the following:

1. Choose a random set of indices, $I \subset \{i: 0 < i \leq L\}$.
2. Choose another random number $r' \in \{0,1\}^\lambda$.
3. Generate $k_{user} = kdf_{mk}(\text{UserID}\|\text{date})$.
4. Encrypt r' to obtain $r = Enc_{k_{user}}(r')$.
5. The 2-tuple challenge (I,r) is sent out to the prover (which can be the delegated user (U) 156 or the backend server repository (R) 154).

Proof Generation (PG) by Repository (R) 154:

To generate a proof for all the data pieces with indices in I, do the following.

1. compute (for R) or retrieve (for U) the user key $k_{user}$;
2. compute $r'=Dec_{k_{user}}(r)$;
3. compute the response as follows:
   (a) for each $i \in I$, retrieve $(D_i, T_i)$;
   (b) compute $X=\Sigma_{i \in I} f_{r'}(i) \cdot h(D_i)$;
   (c) compute $Y=\Sigma_{i \in I} f_{r'}(i) \cdot T_i$;
4. output (X,Y) as the proof p(I).

Proof Verification (PV) by Sensor (S) 120:

Given a proof (X',Y') and the two-tuple (I,r') chosen by the verifier (sensor (S) 120) in the challenge generation, the verification is performed as follows.

1. Retrieve the session keys K,K'.
2. Compute $K_f = \Sigma_{i \in I} f_K(i) \cdot f_{r'}(i)$.
3. Check $Y' \stackrel{?}{=} K_f + K \cdot X'$. If yes, return 1, otherwise, return 0.

Figure 8:
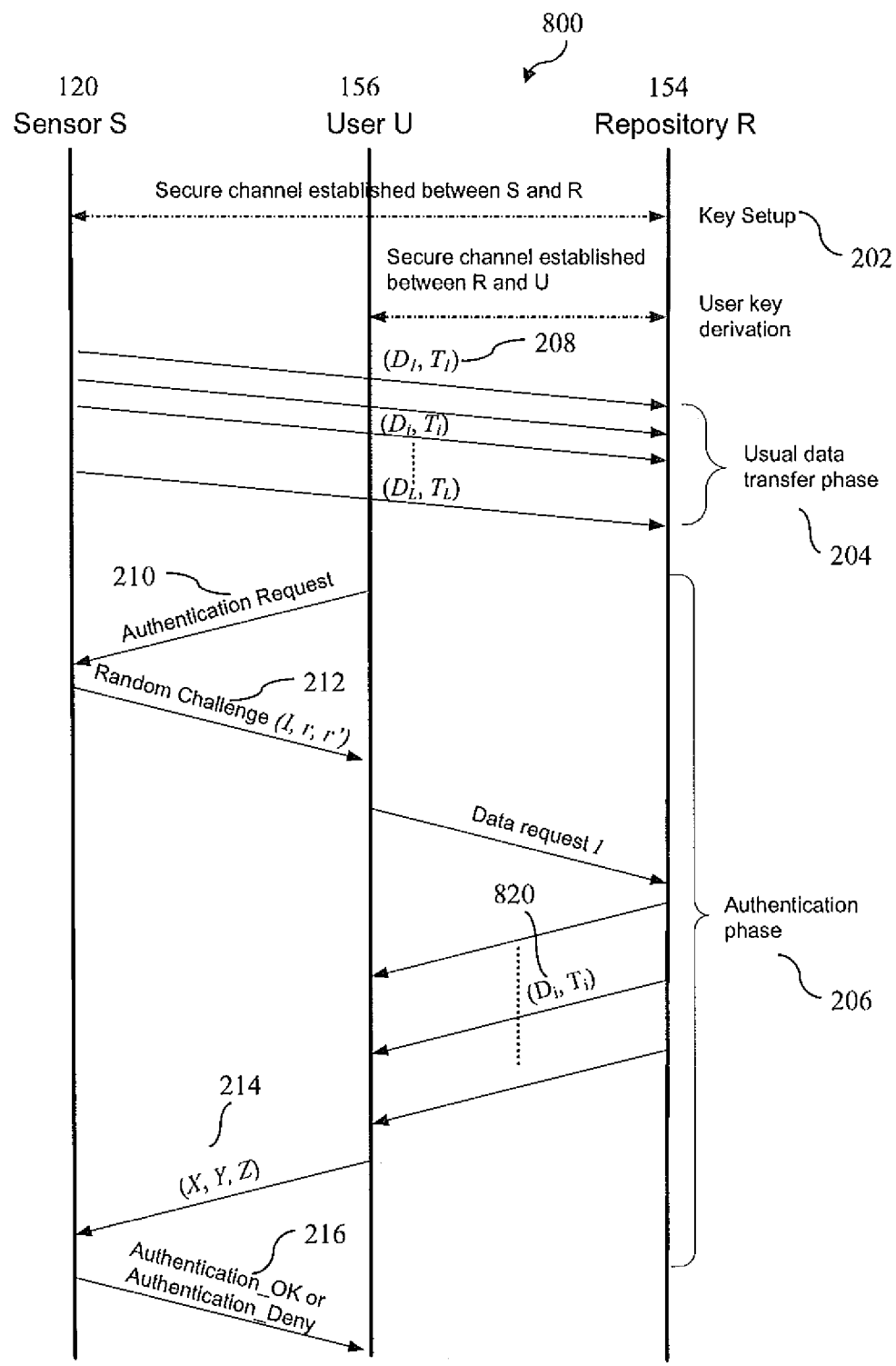
FIGS. 8, 9 and 10 respectively depict different modes of operation of the entity authentication method according to example embodiments of the present invention.
Figure 9:
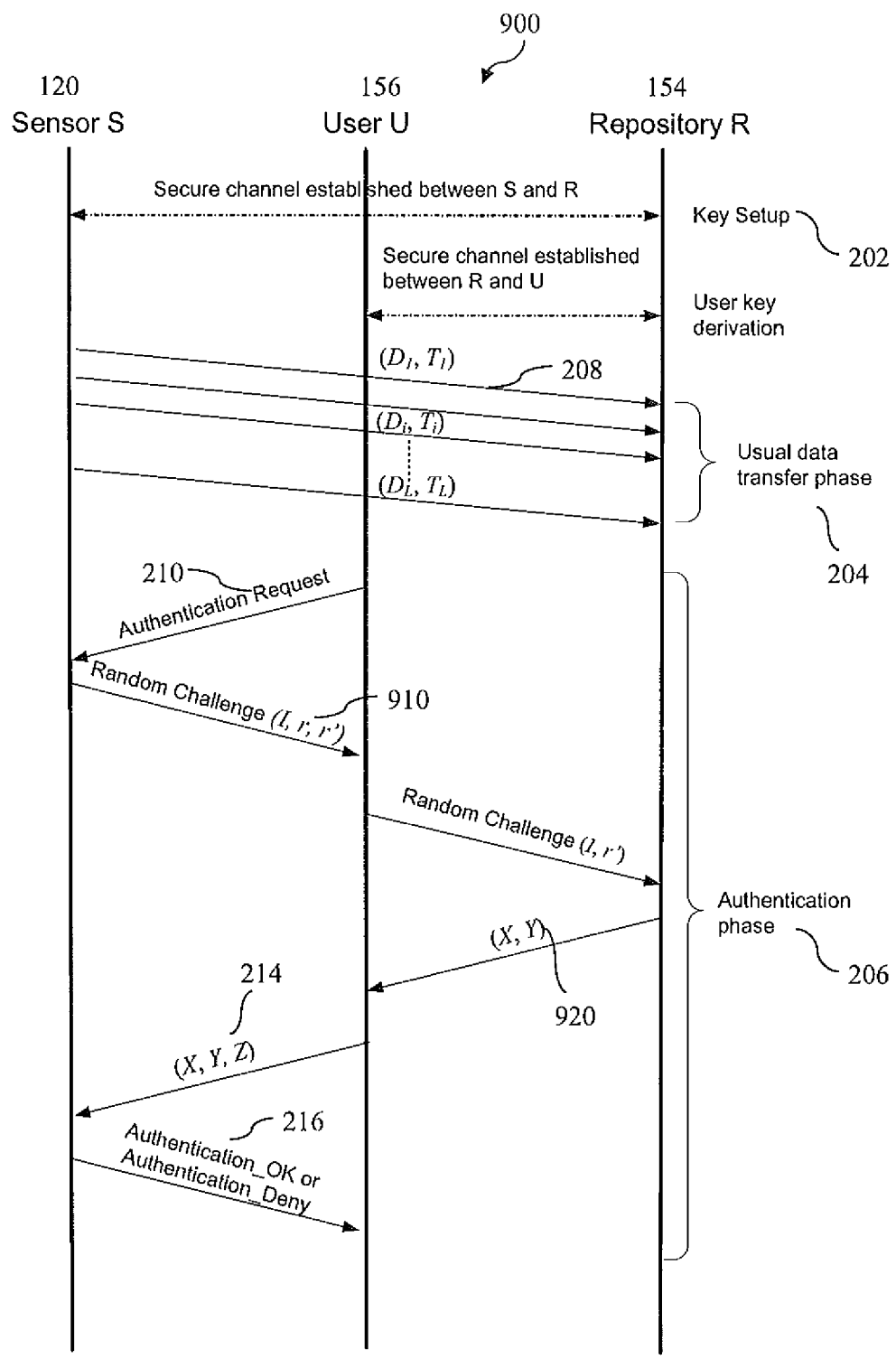
Figure 10:
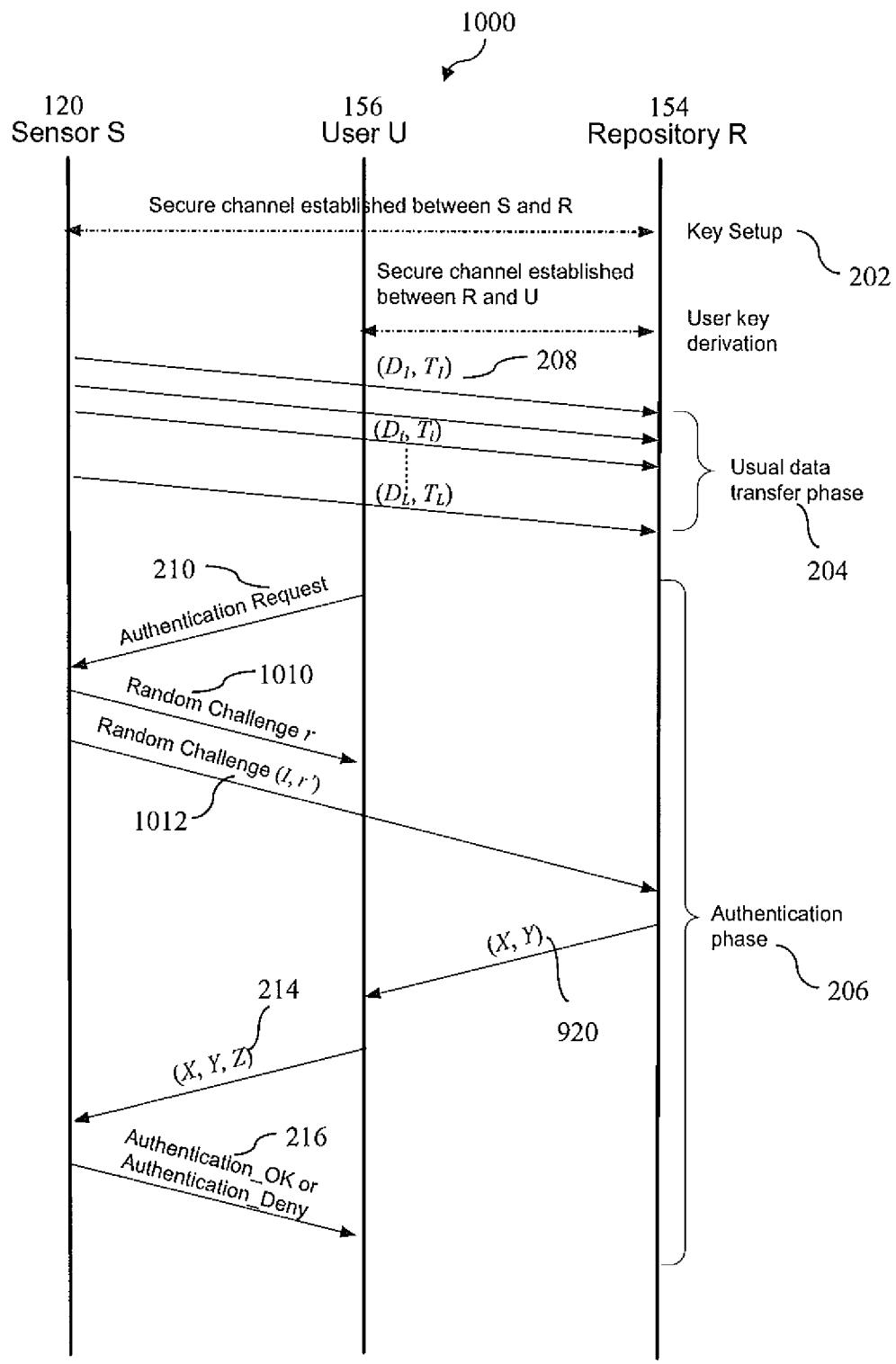

As described hereinbefore, the backend server repository (R) 154 may perform the prover task in an embodiment, or may delegate at least a part of the prover task to the proxy user (U) 156 in another embodiment. Furthermore, various combinations could be used depending on the application settings and scenarios. For example, when the prover task is delegated to a proxy user (U) 156, the repository (R) 154 could still be involved to various extents. In this regard, FIG. 8 shows the case where the proxy user (U) 156 is responsible for all response computation. FIG. 9 shows the case where the proxy user (U) 156 is only involved in relaying the challenge and response for the second authentication factor, whereas, FIG. 10 shows the case where the proxy user (U) 156 is only involved in relaying the response. The only assumption or security criterion for this delegation is that in all cases, a secure (i.e. private and authenticated) channel 158 between the data repository (R) 154 and the user (U) 156 is available. For a better understanding, by way of examples only, the three different modes 800, 900, 1000 of operation briefly mentioned above will now be described further with reference to FIGS. 8, 9 and 10 according to example embodiments of the present invention.

Regardless of which mode is used, the entity authentication method 300 is preferably executed with the following sequence of phases.

First, in the setup phase 202, the backend server repository (R) 154 installs secret keys on a sensor (S) 120 prior to the latter's deployment. In the installation, a 10 master key (mk) is installed on the sensor (S) 120 and its copy is stored safely at repository (R) 154 to establish a secure channel between the sensor (S) 120 and the repository (R) 154. Besides, the master key (mk) also forms the basis for the first authentication factor. The secret keys K,K' which are the basis for the second authentication factor can be chosen by either the sensor (S) 120 or the repository (R) 154. In the latter case, a procedure to ensure a complete erasure of copies of K,K' at R is necessary (see step 406 of FIG. 4).

The second phase is optional. If repository (R) 154 performs the prover task directly without delegating it to the user (U) 156, this phase is not necessary. When there is delegation, repository (R) 154 runs the key derivation function using the master key mk to derive the user key ($k_{user}$) based on the user identity and date, and passes user key ($k_{user}$) to the user (U) 156. The user key ($k_{user}$) establishes a secure communication channel 158 between repository (R) 154 and the user (U) 156. In an embodiment, the sensor/verifier (S) 120 can implement a real time clock to check the validity of the user key ($k_{user}$) as follows: when the date used to derive the user key ($k_{user}$) is older than or does not match that of the real time clock of the sensor (S) 120, the sensor (S) 120 can consider the user key ($k_{user}$) as invalid.

The third phase which is the tagging phase 204 covers the normal operation of the sensor (S) 120 with data transferred from the sensor (S) 120 to the repository (R) 154. When a piece data (denoted by $D_i$) is collected, generated, stored, or used to configure the sensor (S) 120, the sensor (S) 120 runs a certain predetermined/predicate function to determine whether a piece of data ($D_i$) should be tagged and used as authentication data later on. If yes, the sensor (S) 120 retrieves K,K' to run the tag generation algorithm to generate a tag ($T_i$) for the piece of data ($D_i$) and deposits the 2-tuple ($D_i, T_i$) 208 to the repository (R) 154.

There is no restriction on the predetermined function. In the simplest case, data ($D_i$) can be randomly picked for tagging as follows: a random number is generated between 0 and 1, and when the number is between 0 and a certain predefined threshold p (with 0<p<1), the piece of data is tagged. In this case, the probability of tagging is p. As an example only, p could be set at 0.1 in which case 10% of the data passing through the transmission buffer of the sensor (S) 120 are tagged for use in authentication.

In the fourth phase (part of the authentication phase 206), the prover (which can be the user (U) 156 or repository (R) 154 if the proving task is not delegated) sends an authentication request 210 to the sensor (S) 120 requesting access to, e.g., certain privileged functions such as updating the configuration data or firmware. Then the sensor (S) 120 would generate a challenge 212, 910, 1010, 1012 for the prover according to a challenge generation technique described hereinbefore.

In the fifth phase (part of the authentication phase 206), the prover (using a proof generation algorithm as described herein) computes a response corresponding to the challenge received in the fourth phase. Depending on which of the three modes is used, the execution of the fifth phase is different. For example, in the case where the prover is the user (U) 156 as illustrated in FIGS. 8 to 10, the user (U) 156 can use $k_{user}$ (stored in itself) to fulfill the first authentication factor, whereas, for the second authentication factor, the user (U) 156 has to collect all the needed ($D_i, T_i$)-tuples (requested by sensor (S) 120 in the fourth phase) or ask the repository (R) 154 to compute the needed intermediate result in order for it to return a complete, correct response 214 to sensor (S) 120.

In a first mode 800 illustrated in FIG. 8, the user (U) 156 collects all the raw ($D_i, T_i$)-tuples 820 from the repository (R) 154 and computes the complete response (X, Y, Z) 214 on its own. However, in a second mode 900 and a third mode 1000 as illustrated in FIGS. 9 and 10, the repository (R) 154 computes intermediate results/partial response (X, Y) 920 for use by the user (U) 156. The difference between the second mode 900 and the third mode 1000 lies in that, leveraging on the availability of a second channel (for improved security), the sensor (S) 120 in the third mode 1000 sends a part (r) 1010 of the challenge to the user (U) 156 and another part (I,r') 1012 of the challenge directly to the repository (R) 154 so that the repository (R) 154 can compute a partial response (X, Y) 920 and pass it to the user (U) 156.

In the sixth phase (part of the authentication phase 206), the verifier (sensor (S) 120) check whether the response 214 returned from user (U) 156 is valid by running a proof verification algorithm described hereinbefore using the stored secret keys K, K'. The result could be '0' or '1' where '1' indicates an authentication success, and '0' a failure.

As mentioned in the background, conventional two-factor entity authentication typically assumes that the verifier is a powerful machine in terms of computation, memory and storage, rendering them practically infeasible for use in sensor networks, IoT, implant medical devices or SCADA devices (which have limited computational, memory and storage resources). As a result, two-factor authentication is generally unattainable for such devices to authenticate a user with a much more powerful machine. On the other hand, the entity authentication method according to embodiments of the present invention disclosed herein introduces a second authentication factor which allows resource-constrained devices to act as a verifier to authenticate a more powerful machine. In this regard, according to the embodiments, data processed by the verifier such as historical data (the information previously exchanged between the prover and verifier) are used as the second authentication factor. But according to the embodiments, the verifier does not need to store or remember all these past/historical data while being able to authenticate whether a prover has the needed/selected historic data for a particular authentication session. By way of examples only and without limitation, the entity authentication technique according to various embodiments described herein may be implemented for (1) authenticating a user laptop to a sensor node for maintenance, software upgrade or configuration change, (2) authenticating a doctor's wireless reader/transponder to stop, change the pace, or modify other configurations of an implanted deliberator or pacemaker, and (3) authentication a user's laptop to execute a critical instruction on a SCADA device such as opening a power relay.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer-implemented entity authentication method for a network including a first entity and a second entity, the method comprising:
   selecting, at the first entity, one or more pieces of data processed by the first entity to be used for authenticating the second entity;
   tagging, at the first entity, each of the one or more pieces of data selected with a respective tag generated based on a first secret key of the first entity;
   sending, from the first entity, a set of authentication data comprising the one or more pieces of data and the respective tags to the second entity; and
   authenticating, by the first entity, the second entity using a challenge response authentication technique based on the set of authentication data and the first secret key,
   wherein said selecting, said tagging, said sending and said authenticating are each performed using one or more computer processors,
   wherein said authenticating comprises:
      sending, from the first entity, a challenge to the second entity upon receiving an authorization request from the second entity;
      sending, from the second entity, a response to the challenge to the first entity based on the set of authentication data and a second secret key; and
      verifying, at the first entity, whether the response received is valid by processing the response based on the first secret key for authenticating the second entity,
   wherein each pair of the piece of data and the respective tag is indexed in the set of authentication data, and
   wherein:
      said sending a challenge comprises sending the challenge including a selected set of indices from the set of authentication data, a first random number and a second random number,
      said sending a response comprises:
         retrieving each piece of data and tag from the set of authentication data corresponding to an index in the selected set of indices; and
         generating the response including a first parameter obtained based on the retrieved pieces of data and the first random number, a second parameter obtained based on the retrieved tags and the first random number, and a third parameter obtained based on the second random number and the second secret key, and
      said verifying whether the response received is valid comprises:
         computing a first result based on the first and second parameters received and the first secret key, and computing a second result based on the third parameter received and the second secret key generated based on a third secret key that is shared between the first entity and the second entity; and
         verifying whether the response received is valid based on the first and second results,
   wherein the first entity is a sensor, and the second entity comprises a server.

2. The method according to claim 1, wherein said data processed at the first entity comprises pieces of data received or generated by the first entity, and said selecting comprises performing a predetermined function to determine whether to select a piece of data processed by the first entity.

3. The method according to claim 2, wherein the predetermined function is a random function.

4. The method according to claim 1, wherein the tag is generated further based on the piece of selected data associated with the tag.

5. The method according to claim 1, wherein the second entity further comprises a proxy user having established a secured communication channel with the server, and the second key is generated based on a key derivation function using a third secret key shared between the first entity and the second entity, and one or more parameters associated with the proxy user, and wherein said sending a response to the challenge is delegated by the server to the proxy user to generate at least a part of the response.

6. The method according to claim 1, wherein said data processed by the sensor comprises measurement data collected by the sensor and configuration or status data of the sensor.

7. A computer-implemented entity authentication method for a network including a first entity and a second entity, the method comprising:
   selecting, at the first entity, one or more pieces of data processed by the first entity to be used for authenticating the second entity;
   tagging, at the first entity, each of the one or more pieces of data selected with a respective tag generated based on a first secret key of the first entity;

sending, from the first entity, a set of authentication data comprising the one or more pieces of data and the respective tags to the second entity; and authenticating, by the first entity, the second entity using a challenge response authentication technique based on the set of authentication data and the first secret key, wherein said selecting, said tagging, said sending and said authenticating are each performed using one or more computer processors, wherein said authenticating comprises:

sending, from the first entity, a challenge to the second entity upon receiving an authorization request from the second entity;

sending, from the second entity, a response to the challenge to the first entity based on the set of authentication data and a second secret key; and verifying, at the first entity, whether the response received is valid by processing the response based on the first secret key for authenticating the second entity, wherein each pair of the piece of data and the respective tag is indexed in the set of authentication data, and wherein:

said sending a challenge comprises sending the challenge including a selected set of indices from the set of authentication data, a random number encrypted using the second secret key generated based on a third secret key shared between the first entity and the second entity, said sending a response comprises:

retrieving each piece of data and tag from the set of authentication data corresponding to an index in the selected set of indices; and generating the response including a first parameter obtained based on the retrieved pieces of data and the second secret key, and a second parameter obtained based on the retrieved tags and the second secret key, and said verifying whether the response received is valid comprises:

computing a result based on the first and second parameters received, and the first and second secret keys; and verifying whether the response received is valid based on the result, wherein the first entity is a sensor, and the second entity comprises a server.

8. A system with entity authentication for a network, the system comprising:

a first entity, and a second entity communicatively coupled to the first entity over the network, wherein the first entity comprises:

a selection module configured to select one or more pieces of data processed by the first entity to be used for authenticating the second entity;

a tagging module configured to:

tag each of the one or more pieces of data selected with a respective tag generated based on a first secret key of the first entity; and send a set of authentication data comprising the one or more pieces of data and the respective tags to the second entity; and an authentication module configured to authenticate the second entity using a challenge-response authentication technique based on the set of authentication data and the first secret key, wherein:

the authentication module of the first entity is configured to send a challenge to the second entity upon receiving an authorization request from the second entity;

the second entity comprises a proof generation module configured to send a response to the challenge to the first entity based on the set of authentication data and a second secret key; and the authentication module of the first entity is further configured to verify whether the response received is valid by processing the response based on the first secret key for authenticating the second entity, wherein each pair of the piece of data and the respective tag is indexed in the set of authentication data, and wherein:

the authentication module of the first entity is configured to send the challenge including a selected set of indices from the set of authentication data, a first random number and a second random number, the proof generation module of the second entity is configured to:

retrieve each piece of data and tag from the set of authentication data corresponding to an index in the selected set of indices; and generate the response including a first parameter obtained based on the retrieved pieces of data and the first random number, a second parameter obtained based on the retrieved tags and the first random number, and a third parameter obtained based on the second random number and the second secret key, and the authentication module is further configured to:

compute a first result based on the first and second parameters received and the first secret key, and computing a second result based on the third parameter received and the second secret key generated based on a third secret key that is shared between the first entity and the second entity; and verify whether the response received is valid based on the first and second results.

9. The system according to claim 8, wherein said data processed at the first entity comprises pieces of data received or generated by the first entity, and the selection module is configured to perform a predetermined function to determine whether to select a piece of data processed by the first entity.

10. The system according to claim 9, wherein the predetermined function is a random function.

11. The system according to claim 8, wherein the tag is generated further based on the piece of selected data associated the tag.

12. The system according to claim 8, wherein the second entity comprises a server and a proxy user having established a secured communication channel with the server, and the second key is generated based on a key derivation function using a third secret key shared between the first entity and the second entity, and one or more parameters associated with the proxy user, and wherein the server comprises a delegation module configured to delegate at least a part of the functions of the proof generation module to the proxy user to generate at least a part of the response.

13. The system according to claim 8, wherein the first entity is a sensor and said data processed by the sensor comprises measurement data collected by the sensor and configuration or status data of the sensor.

14. A system with entity authentication for a network, the system comprising:
   a first entity, and
   a second entity communicatively coupled to the first entity over the network, wherein
   the first entity comprises:
   a selection module configured to select one or more pieces of data processed by the first entity to be used for authenticating the second entity;
   a tagging module configured to:
      tag each of the one or more pieces of data selected with a respective tag generated based on a first secret key of the first entity; and
      send a set of authentication data comprising the one or more pieces of data and the respective tags to the second entity; and
   an authentication module configured to authenticate the second entity using a challenge-response authentication technique based on the set of authentication data and the first secret key,
   wherein:
      the authentication module of the first entity is configured to send a challenge to the second entity upon receiving an authorization request from the second entity;
      the second entity comprises a proof generation module configured to send a response to the challenge to the first entity based on the set of authentication data and a second secret key; and
      the authentication module of the first entity is further configured to verify whether the response received is valid by processing the response based on the first secret key for authenticating the second entity,
   wherein each pair of the piece of data and the respective tag is indexed in the set of authentication data, and wherein:
   the authentication module of the first entity is configured to send a challenge comprises sending the challenge including a selected set of indices from the set of authentication data, a random number encrypted using the second secret key generated based on a third secret key shared between the first entity and the second entity,
   the proof generation module of the second entity is configured to:
      retrieve each piece of data and tag from the set of authentication data corresponding to an index in the selected set of indices; and
      generate the response including a first parameter obtained based on the retrieved pieces of data and the second secret key, and a second parameter obtained based on the retrieved tags and the second secret key, and
   the authentication module is further configured to:
      compute a result based on the first and second parameters received, and the first and second secret keys; and
      verify whether the response received is valid based on the result.

* * * * *